(12) United States Patent
Desclos et al.

(10) Patent No.: US 9,110,160 B2
(45) Date of Patent: Aug. 18, 2015

(54) LOCATION FINDING USING CELLULAR MODAL ANTENNA

(75) Inventors: Laurent Desclos, San Diego, CA (US); Sebastian Rowson, San Diego, CA (US); Jeffrey Shamblin, San Diego, CA (US)

(73) Assignee: ETHERTRONICS, INC., San Diego, CA (US)

( * ) Notice: Subject to any disclaimer, the term of this patent is extended or adjusted under 35 U.S.C. 154(b) by 308 days.

(21) Appl. No.: 13/557,182

(22) Filed: Jul. 24, 2012

(65) Prior Publication Data

US 2013/0194133 A1   Aug. 1, 2013

Related U.S. Application Data

(60) Provisional application No. 61/511,109, filed on Jul. 24, 2011.

(51) Int. Cl.

| | |
|---|---|
| *H01Q 3/02* | (2006.01) |
| *H01Q 3/12* | (2006.01) |
| *G01S 19/35* | (2010.01) |
| *G01S 19/36* | (2010.01) |
| *H01Q 1/24* | (2006.01) |
| *H01Q 3/44* | (2006.01) |
| *G01S 19/28* | (2010.01) |

(52) U.S. Cl.
CPC .................. *G01S 19/35* (2013.01); *G01S 19/36* (2013.01); *H01Q 1/242* (2013.01); *H01Q 3/44* (2013.01); *G01S 19/28* (2013.01)

(58) Field of Classification Search
CPC ............. H01Q 3/02; H01Q 3/12; H01Q 3/00; H01Q 1/242; H01Q 3/44; G01S 19/33; G01S 3/16; G01S 3/28; G01S 19/35; G01S 19/28; G01S 19/36
USPC ...................... 342/374, 357.73, 382, 359, 360
See application file for complete search history.

(56) References Cited

U.S. PATENT DOCUMENTS

| | | | |
|---|---|---|---|
| 7,911,402 B2 | 3/2011 | Rowson et al. | |
| 2001/0050640 A1* | 12/2001 | Apostolos | 343/700 MS |
| 2003/0146874 A1* | 8/2003 | Kane et al. | 343/702 |
| 2013/0109327 A1* | 5/2013 | Matsumori et al. | 455/73 |

* cited by examiner

*Primary Examiner* — Harry Liu
(74) *Attorney, Agent, or Firm* — Coastal Patent Law Group, P.C.

(57) ABSTRACT

The instant disclosure concerns an antenna system and method for location-finding of a wireless communication device. A cellular multimode antenna is configured to analyze pilot signals from base station towers across a plurality of antenna modes. Information corresponding to the received signals and each antenna mode is analyzed to determine a location fix. In certain optional embodiments, the location fix determined by the cellular multimode antenna is used to determine an optimal mode for a second GPS modal antenna, such that the selected mode of the GPS modal antenna provides optimum signal quality with the global positioning system. In this regard, the cellular multimode antenna estimates the location of the device, and a mode for the GPS modal antenna is selected based on the location fix such that the GPS antenna is capable of quickly determining a precise position of the device.

5 Claims, 9 Drawing Sheets

LOCATION FINDING USING CELLULAR MODAL ANTENNA

CROSS-REFERENCE TO RELATED APPLICATIONS

This application claims benefit of priority with U.S. Provisional Ser. No. 61/511,109, filed Jul. 24, 2011; the contents of which are hereby incorporated by reference.

FIELD OF INVENTION

This invention relates to location and positioning systems for mobile communication devices, and more particularly to an improved antenna system for location finding using cellular and global positioning system (GPS) signal reception.

BACKGROUND OF THE INVENTION

As mobile wireless devices and applications become increasingly prevalent, location and positioning services based on global positioning system (GPS) systems continue to flourish. Current GPS receiver technology allows for low cost, high performance GPS receivers to be installed in an increasing number of mobile devices.

In the United States the FCC 911 mandate addresses the requirement for location of cell phones during emergency situations available to dispatchers. Known as Assisted GPS, generally abbreviated as A-GPS, is a system which can, under certain conditions, improve the startup performance, or Time To First Fix (TTFF) of a GPS satellite-based positioning system. It is used extensively with GPS-capable cellular phones to address the 911 mandate.

SUMMARY OF THE INVENTION

Accordingly, it is an object of the invention to solve these and other problems in the art by providing a multimode antenna with multiple radiation pattern modes to improve the link budget for the GPS link as well as speed acquisition time.

BRIEF DESCRIPTION OF THE DRAWINGS

In accordance with various embodiments, the several figures can be understood in conjunction with a thorough review of the appended description, wherein.

DETAILED DESCRIPTION OF THE PREFERRED EMBODIMENTS

Figure 1:
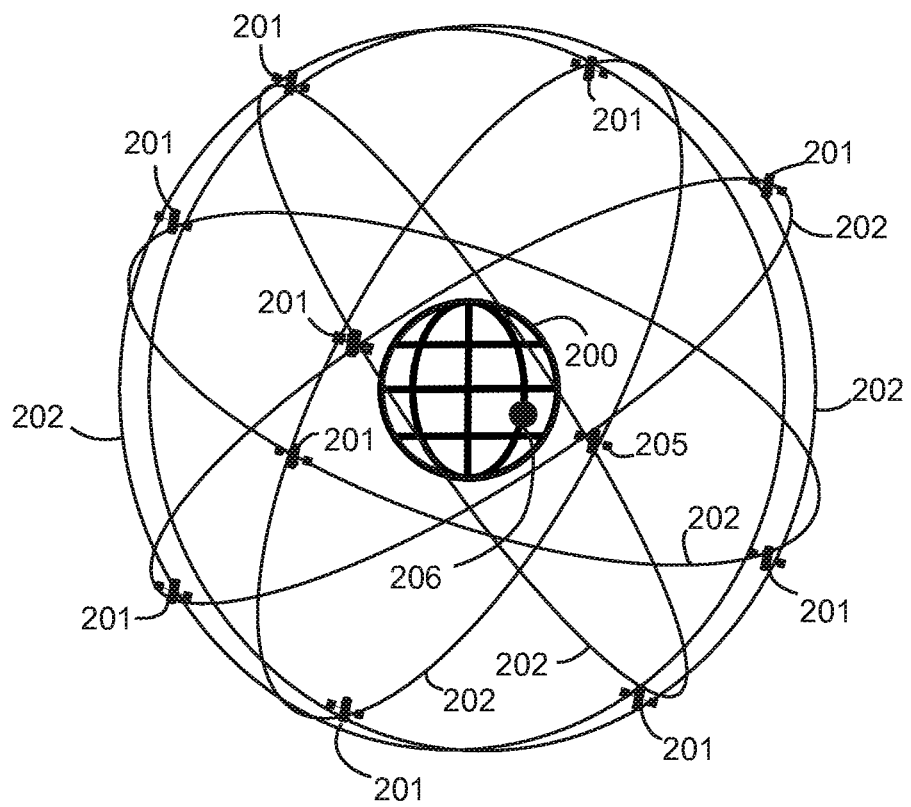
FIG. 1 illustrates the compliment of GPS satellites orbiting the Earth, to form the GPS constellation.

In the following description, for purposes of explanation and not limitation, details and descriptions are set forth in order to provide a thorough understanding of the present invention. However, it will be apparent to those skilled in the art that the present invention may be practiced in other embodiments that depart from these details and descriptions.

For purposes herein, the terms "multimode antenna" and "modal antenna" are each interchangeable and intended to be defined by its ordinary meaning as understood by those with skill in the art, that is, such a multimode antenna is defined as an antenna configurable about a plurality of modes, wherein the antenna is configured with a distinct radiation pattern exhibited from the antenna in each of the plurality of modes. An example of a multimode antenna can be further referenced in commonly owned U.S. Pat. No. 7,911,402, issued Mar. 22, 2011.

In one embodiment, a GPS modal antenna is connected to a low noise amplifier (LNA), a central processing unit (CPU) and memory bank. The memory bank stores information relating to configuration of the various antenna modes of the modal antenna. For example, a first mode might require a quantified current to be provided to a particular parasitic element positioned adjacent to a radiator portion of the GPS modal antenna. Various antenna modes will differ with regard to configuration and tuning. Several modes of the antenna are programmed and stored within the memory bank. The GPS modal antenna is configured to scan and ping various GPS satellites, and record a value for signal level of each of the GPS satellites queried. A satellite query is then performed across various antenna modes, and signal data is recorded for each mode. An optimal antenna mode is selected from the collected data based on maximum received signal, and number of satellites providing sufficient communication link quality. In this regard, an algorithm can be programmed into the CPU and memory of the antenna system, the algorithm being programmed to scan and determine an optimal antenna mode for maximizing GPS communications signal and establishing a position fix with the device. By scanning multiple antenna modes, the antenna can be configured for maximum signal efficiency, thus reducing GPS position acquisition time.

In certain embodiments, a modal GPS antenna includes an antenna radiator disposed above a ground plane and forming an antenna volume there between; a tuning conductor positioned within the antenna volume, the tuning conductor attached to a first active element for varying a reactance of the antenna; a steering conductor outside of said antenna volume and adjacent to the antenna radiator, wherein the steering conductor is attached to a second active element for varying a current mode thereon. The antenna radiator is configured and the steering conductor is adjusted in length and positioned in relation to the antenna radiator to tune the frequency response of the antenna radiator to provide for reception of signals in the GPS frequency band, and provide multiple radiation modes within the GPS frequency band.

In other embodiments, an algorithm is programmed within the memory of the device to switch antenna modes in an efficient method to reduce acquisition time for determination of a location fix. The algorithm commands the modal antenna to dwell on Mode 0 and acquire signals from various satellites within the field of view. If a time metric for signal acquisition is exceeded for one or multiple satellite signals, then the algorithm commands the modal antenna to switch to the next antenna mode and signals are acquired. The satellite signals acquired per antenna mode are stored in a data base for future reference.

In another embodiment, an algorithm is programmed within the memory of the device to reduce "Cold" and "Hot" start times for a 2D (two dimensional) fix for a GPS system by conducting a survey of all modes on a modal antenna to determine the mode with the strongest signal strength from three satellites. During the initial survey of modes, the algorithm commands the mode to be used just long enough for a measure of signal strength from the three satellites with the strongest signals. The algorithm then commands the modal antenna to switch to and sample signal strength on the next mode. When all modes have been sampled the mode with the strongest three signals is selected and used to acquire a 2D location fix. All antenna modes sampled during the signal acquisition process are stored in a data base for use to determine antenna mode with highest probability of acquisition for future system usage.

In yet another embodiment, an algorithm is programmed within memory of the device and adapted to reduce "Cold" and "Hot" start times for a 2D (two dimensional) fix for a GPS system by switching to Mode 0 and sampling receive signal strength. If the received signal strength from three satellites is above a specific metric, the algorithm commands that this mode be used for location fix. If the signal strength from three satellites on this mode falls below a signal level metric, the algorithm commands the modal antenna to switch to the next mode and repeat the sampling process. All antenna modes sampled during the signal acquisition process are stored in a data base for use to determine antenna mode with highest probability of acquisition for future system usage.

In certain embodiments, the algorithm includes wherein a 3D (three-dimensional) location fix is required and the algorithm samples all antenna modes to determine the mode with the four strongest signals.

In certain other embodiments, the algorithm includes wherein a 3D (three-dimensional) location fix is required and the algorithm samples the first Mode and dwells on this Mode if the received signal strength from three satellites is above a specific metric. If the signal strength from four satellites on this mode falls below a signal level metric, the algorithm commands the modal antenna to switch to the next mode and repeat the sampling process. All antenna modes sampled during the signal acquisition process are stored in a data base for use to determine antenna mode with highest probability of acquisition for future system usage.

The first and second active elements are individually selected from the group consisting of: switches, voltage controlled tunable capacitors, voltage controlled tunable phase shifters, varactor diodes, PIN diodes, MEMS switches, MEMS tunable capacitors, BST tunable capacitors, and FET's.

In another embodiment, an algorithm is configured to acquire a location fix wherein all modes on a GPS modal antenna are surveyed and one or a combination of modes are used to determine a location fix. If two or less satellites can be acquired during a specific timeframe, a base station is accessed using the A-GPS system to determine a unique location.

Figure 9:
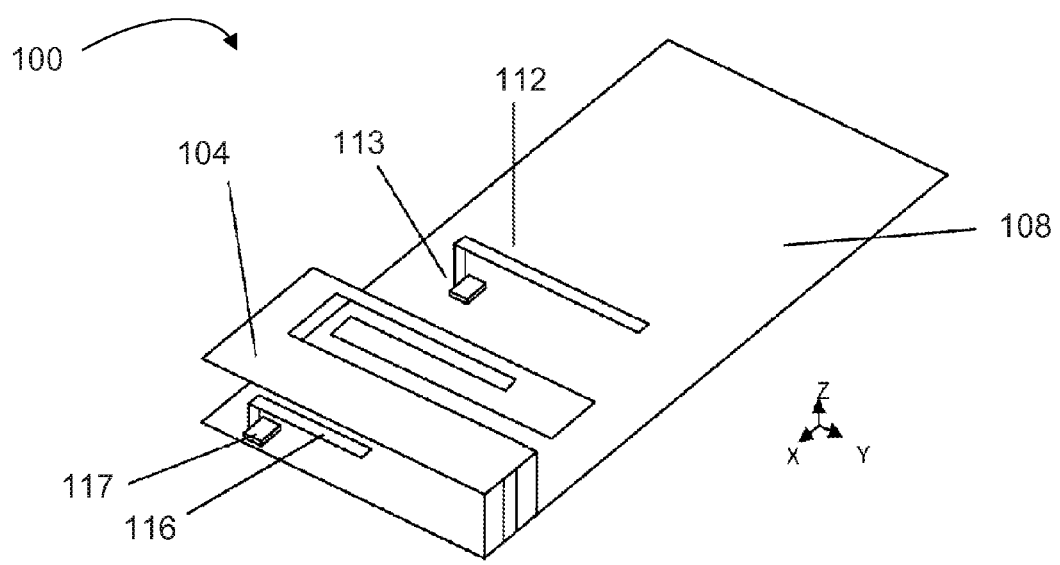
FIG. 9 illustrates a multimode antenna.

In another embodiment as illustrated in FIG. 9, a multimode antenna 100 comprises: an antenna radiator 104 disposed above a ground plane 108 and forming an antenna volume there between; a tuning conductor 116 positioned within the antenna volume, the tuning conductor attached to a first active element 117 for varying a reactance of the antenna; a steering conductor 112 positioned outside of said antenna volume and adjacent to said antenna radiator, the steering conductor attached to a second active element 113 for varying a current mode thereon. The antenna radiator is configured and the steering conductor is adjusted in length and positioned in relation to the antenna radiator to tune the frequency response of the antenna radiator to provide for reception of signals in one or multiple cellular or communication frequency bands, and provide multiple radiation modes within the one or multiple frequency bands. Wherein pilot signals from two or more base stations are received with the multimode antenna; multiple radiation modes are used to measure the pilot signals and the received power level of the pilot signals for multiple modes are measured and stored in memory in a microprocessor or other memory located on the mobile device that the multimode antenna is connected to. The receive signal levels are compared to a data base of stored radiation patterns for the multiple modes, and a measure of angle of arrival of the pilot signals are performed. An intersection of rays or lines parallel to the angle of arrival of two or more pilot signals are used to determine a location fix.

In another embodiment, a multimode antenna includes a tunable component with two or more tuning states being connected to the steering conductor to alter the reactance of the steering conductor. The tunable component is adjusted to steer the null, or low signal region, and pilot signals are monitored as the null of the radiation pattern of the multimode antenna is steered. A measure of the receive signal strength of multiple pilot signals is performed and the angle of arrival of two or more pilot signals is determined. An intersection of rays or lines parallel to the angle of arrival of two or more pilot signals are used to determine a location fix.

In another embodiment, the location information derived from the antenna system is sent to the GPS receiver and used to update location information in the GPS system.

Now turning to the drawings, FIG. 1 illustrates the compliment of GPS satellites 201 orbiting the Earth 200, to form the GPS constellation. Each respective GPS satellite is shown having a respective orbit 202 associated therewith. A variable number of satellites 205 are in the field of view of the receiving antenna 206 at any point in time.

Figure 2:
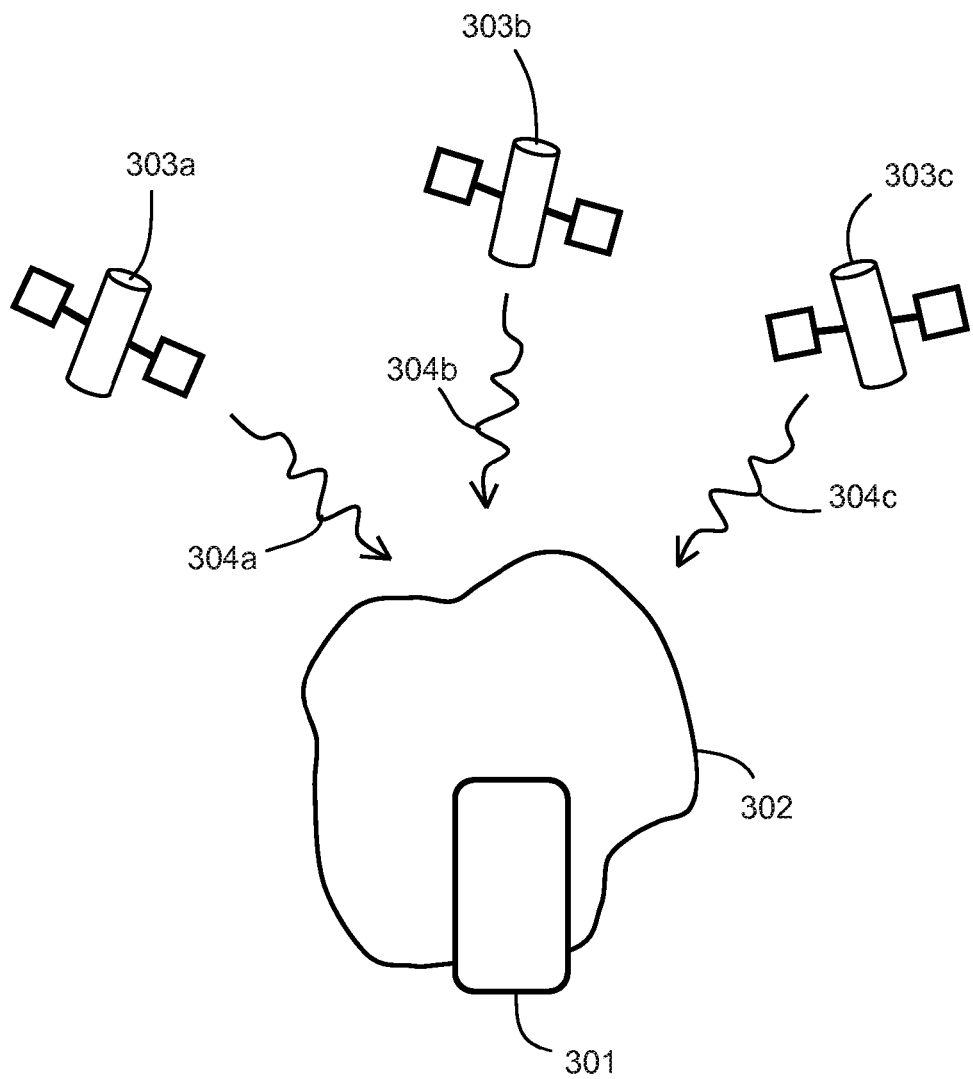
FIG. 2 illustrates a mobile device with passive GPS antenna in the field of view of N GPS satellites.

FIG. 2 illustrates a mobile device 301 with a passive GPS antenna in the field of view of "N" GPS satellites 303a; 303b; 303c. The radiation pattern 302 of the passive antenna is shown. The satellites communicate with the mobile device via signals 304a; 304b; 304c. Depending on a variety of factors, such as the antenna pattern, reactive loading of the device, and orientation of the device during operation, the passive antenna may have a gain maxima or minima in the direction of the satellite and corresponding signals.

Figure 3:
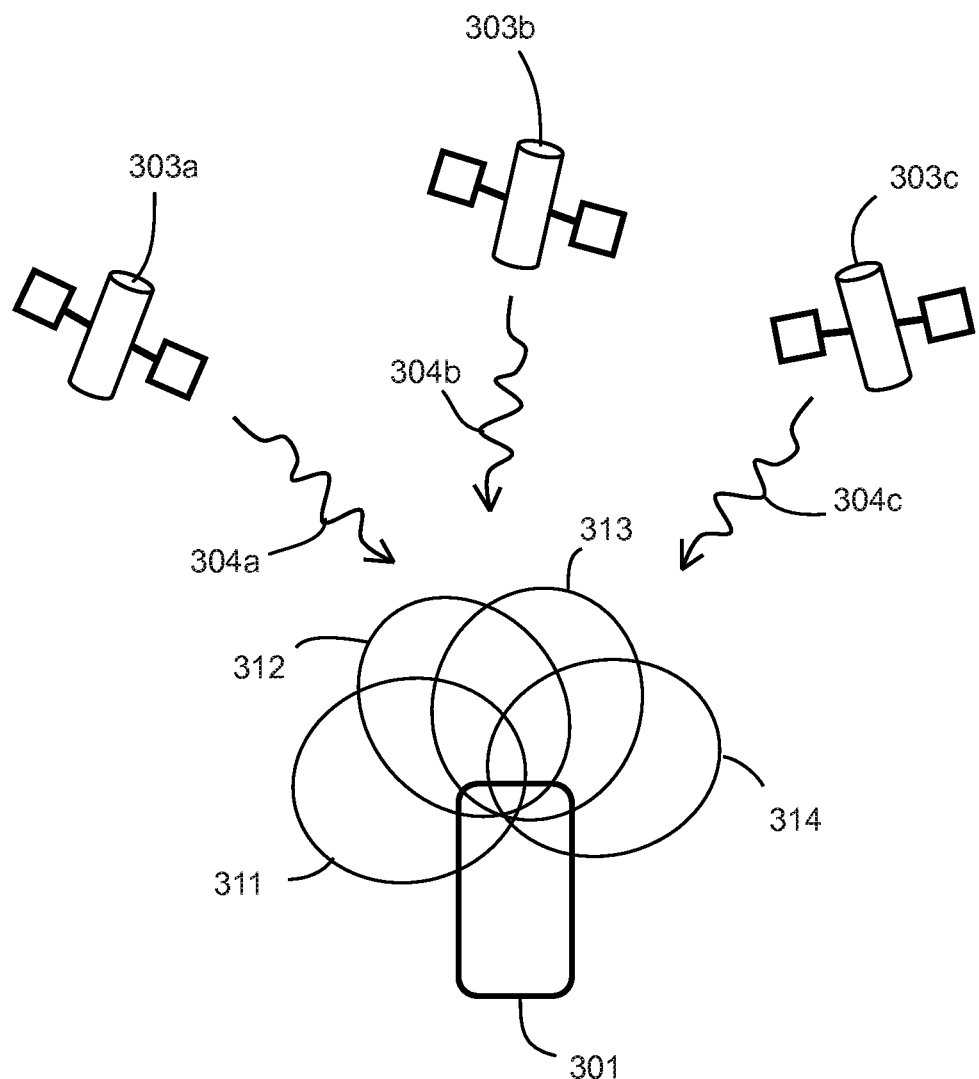
FIG. 3 illustrates a mobile device with a multimode GPS antenna in the field of view of N GPS satellites.

FIG. 3 illustrates a mobile device 301 with a multimode GPS antenna, also referred to as a "modal antenna", the device and antenna being in the field of view of N GPS satellites 303a; 303b; 303c. Each satellite communicates with the device via a signal 304a; 304b; 304c, respectively. The plurality of radiation patterns 311; 312; 313; 314 generated by the antenna when configured in each of the multiple modes are shown. The antenna will produce a distinct radiation pattern in each antenna mode. Because the antenna can be configured about various antenna modes, an optimal mode having gain maxima in the direction of the intended satellites can be selected for optimum signal quality.

Figure 4:
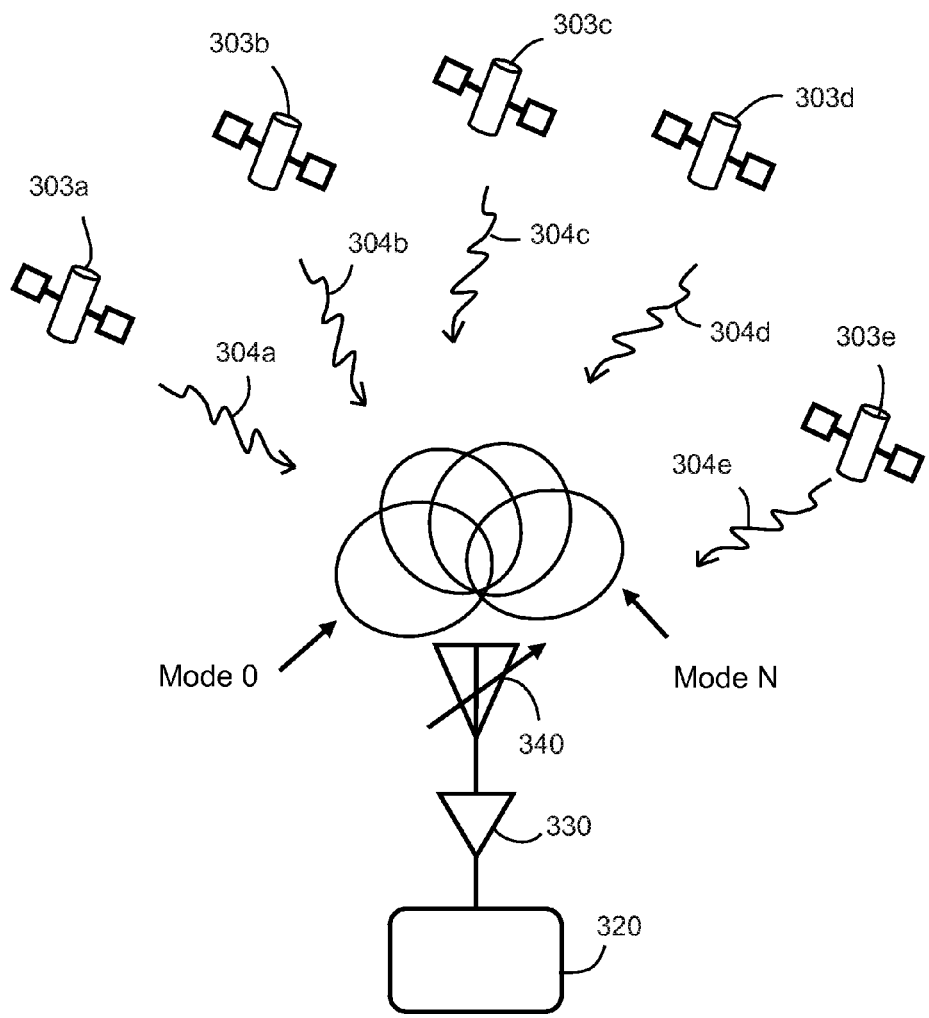
FIG. 4 illustrates a mobile device with multimode GPS antenna in the field of view of N GPS satellites.

FIG. 4 illustrates a mobile device 320 coupled to a low noise amplifier (LNA) 330 and further coupled with a multimode GPS antenna 340 in the field of view of N GPS satellites 303a; 303b; 303c; 303d; 303e. The radiation patterns generated by the multiple modes (Mode 0 to Mode N) are shown. The number of satellite signals 304a; 304b; 304c; 304d; 304e per mode is stored in a look-up table in the processor for use in a more rapid acquisition of multiple signals for a location fix.

Figure 5:
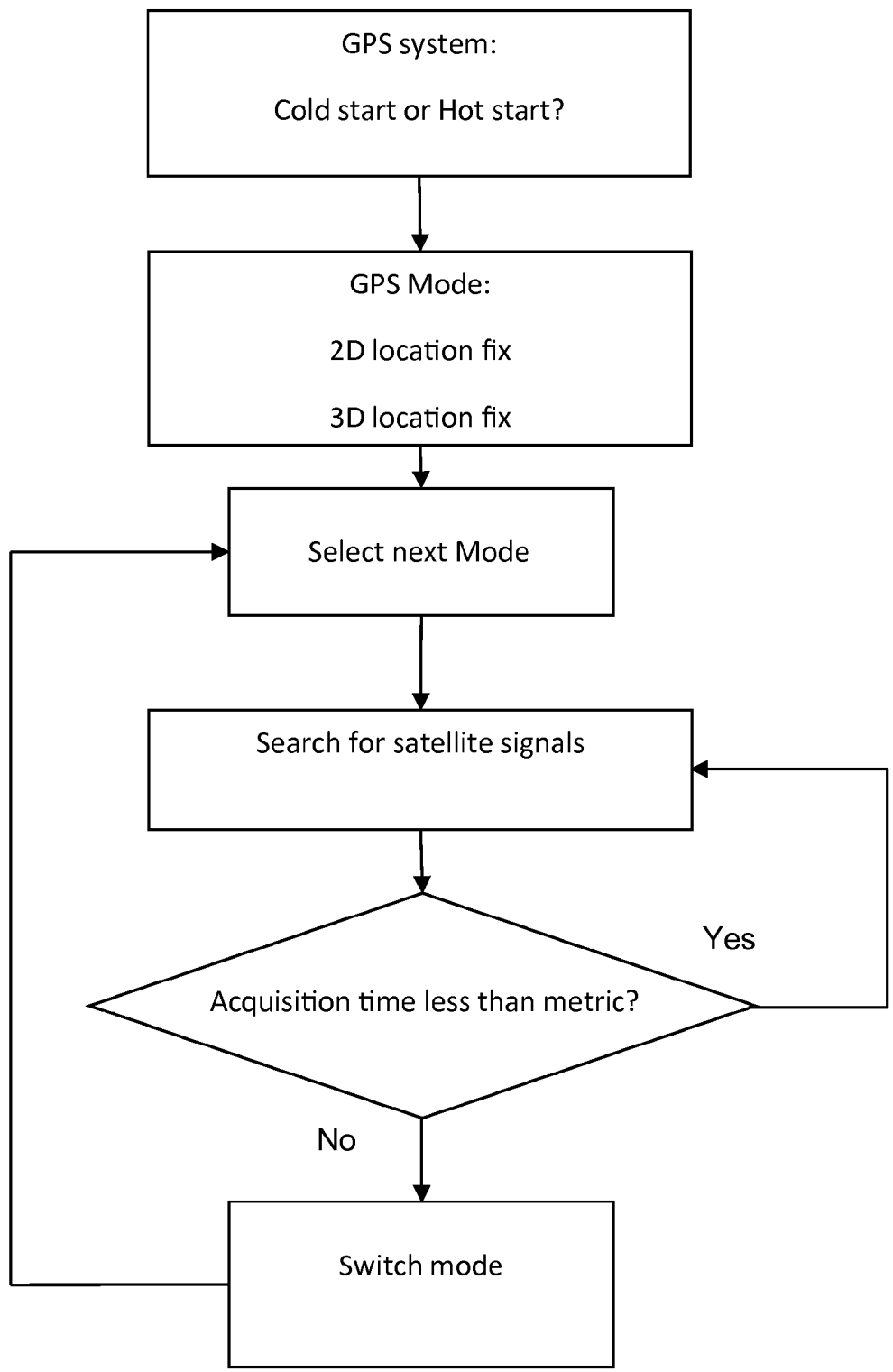
FIG. 5 illustrates a flowchart of a Modal Antenna Acquisition Process.

FIG. 5 illustrates a flowchart of a Modal Antenna Acquisition Process. The process leads to a more rapid location fix of a GPS system for both "cold" and "hot" starts, and takes into account the desire or requirement for a 2D or 3D location fix.

Figure 6:
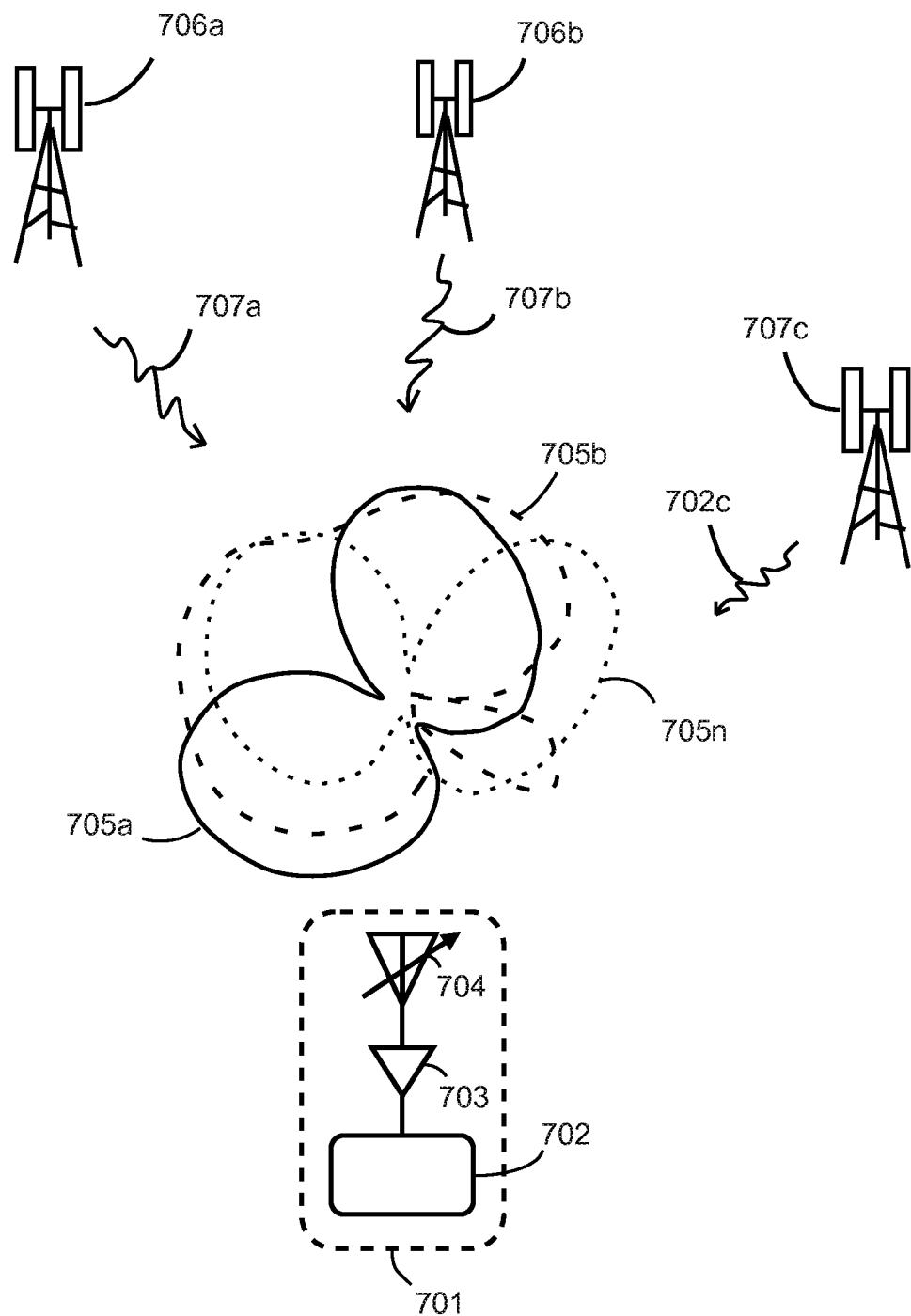
FIG. 6 illustrates a multimode cellular antenna in the field of view of three base stations.

FIG. 6 illustrates a wireless device 701 including a cellular multimode antenna 704 coupled to a low noise amplifier (LNA) 703 and further coupled to a processor and memory 702 with the device in the field of view of three cellular base stations 706a; 706b; 706c. Three radiation patterns 705a; 705b; 705n each corresponding to one of three antenna modes are shown about the device. A processor in the mobile device accesses pre-stored radiation pattern data for the modes to use a reference for comparison with real-time measurements to estimate angle of arrival of received signals 707a; 707b; 707c from the base stations.

Figure 7A:
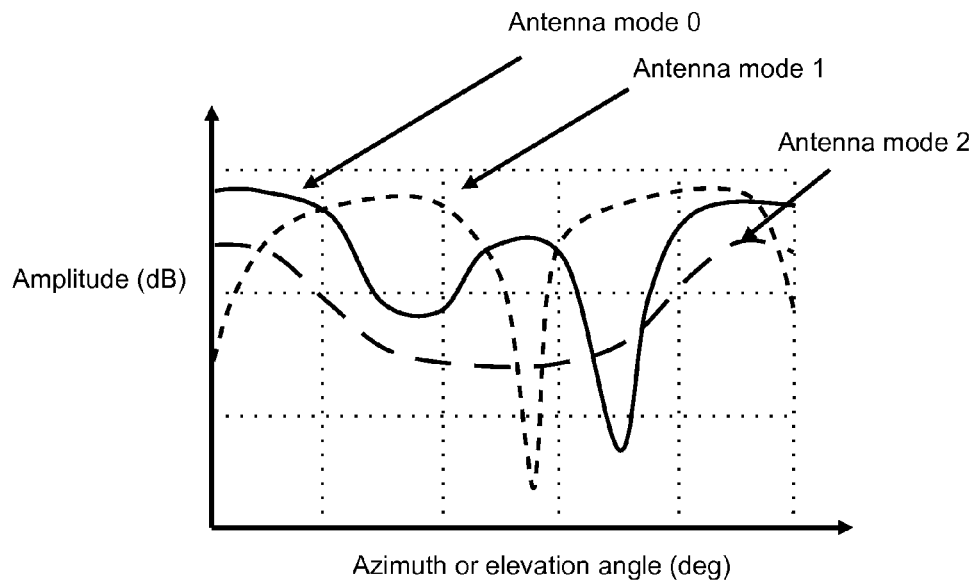
FIG. 7 illustrates an example of a set of amplitude and phase patterns for a three Mode multimode antenna

FIG. 7A illustrates amplitude patterns for a three mode multimode antenna.

Figure 7B:
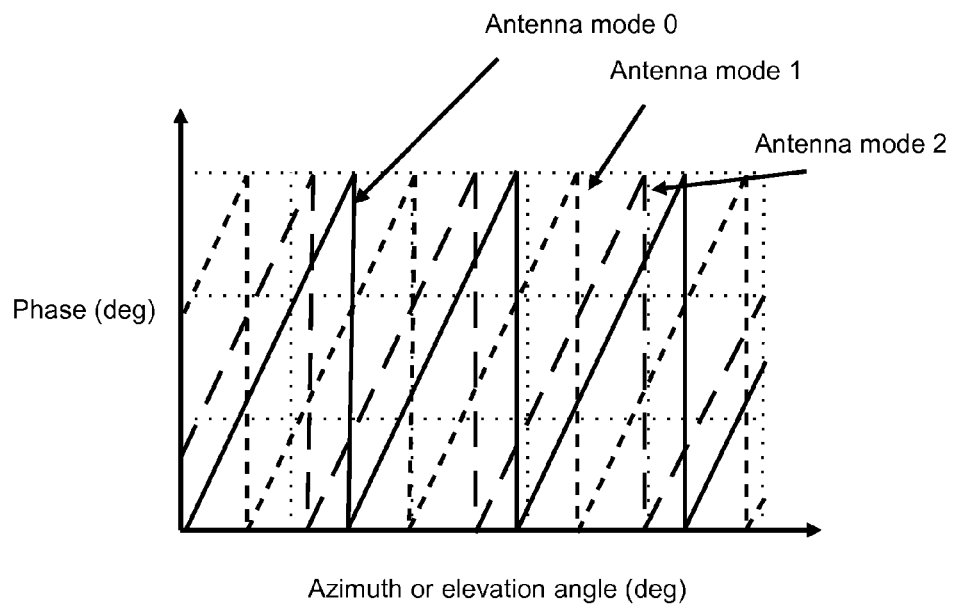

FIG. 7B further illustrates phase patterns for a three mode multimode antenna The unique properties of either or both amplitude and phase can be used to discern angle of arrival.

Figure 8:
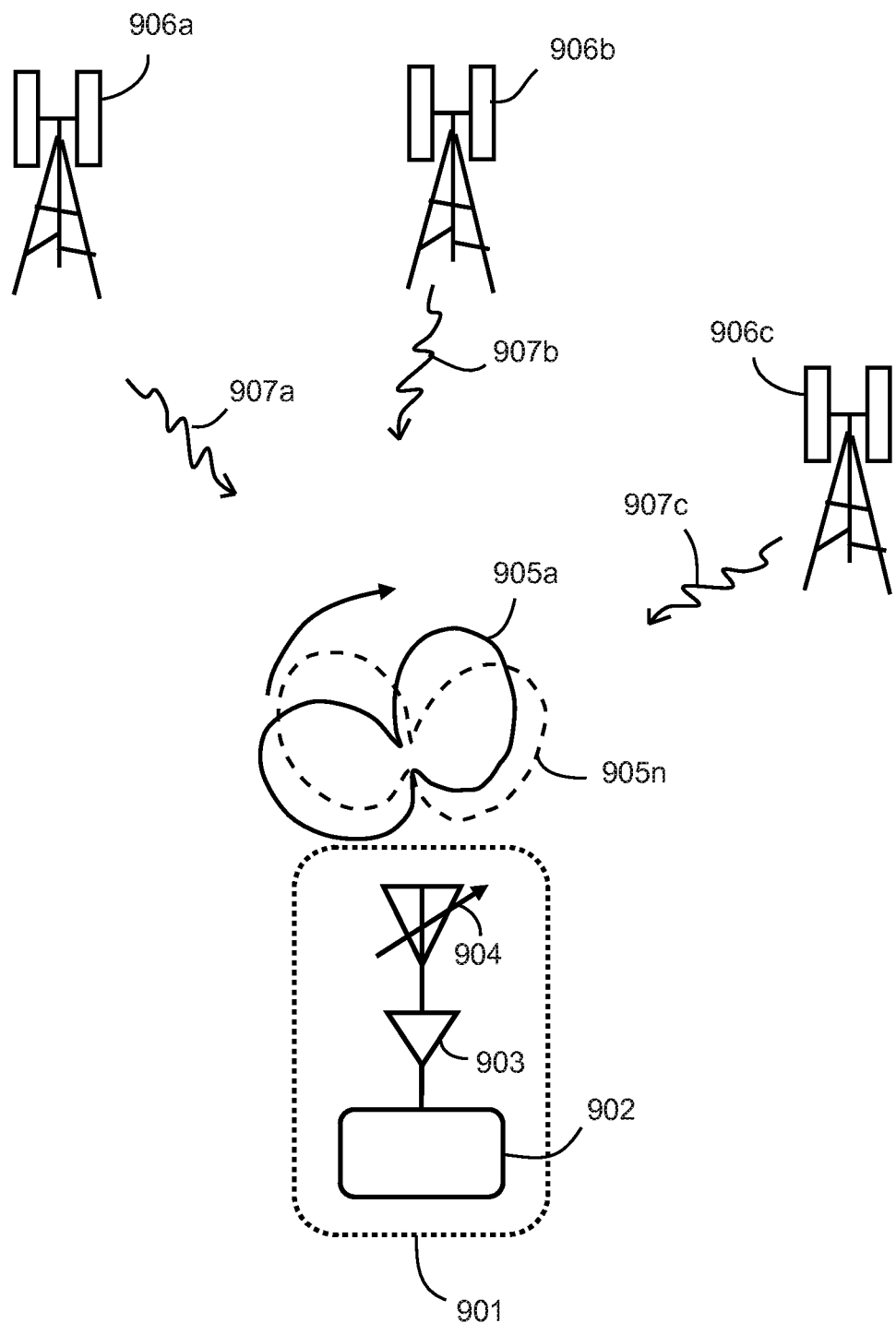
FIG. 8 illustrates a multimode cellular antenna in the field of view of three base stations.

FIG. 8 illustrates a wireless device 901 having a multimode cellular antenna 904 coupled to an LNA 903 and further coupled to a processor and memory 902, the device being in the field of view of three base stations 906a; 906b; 906c. A variable antenna radiation pattern is shown 905a; 905n. The null in the radiation pattern is steered to scan the pilot signals 907a; 907b; 907c from the base stations. The angle of arrival is determined by null position for lowest received signal for the pilot signal under test.

We claim:

1. A method for acquisition of a device location using base station transceivers of a cellular communication network, the method comprising:
    with a cellular modal antenna of the device, the cellular modal antenna being selectable about a plurality of possible antenna modes, wherein the cellular modal antenna is configured to produce a distinct radiation pattern in each of said plurality of possible modes, the cellular modal antenna including:
        a radiating element positioned above a circuit board forming an antenna volume therebetween;
        a tuning conductor element positioned within the antenna volume, the tuning conductor coupled to a first active element for varying a reactance of the tuning conductor; and
        a steering conductor positioned outside of the antenna volume and adjacent to the radiating element, the steering conductor coupled to a second active element for varying a current mode of the steering conductor;
        wherein the radiating element, tuning conductor, and steering conductor are each configured such that said corresponding radiation patterns of the cellular modal antenna in each of said plurality of possible modes produces a frequency response in cellular communication bands for connecting the device to the base station transceivers of the cellular communication network;
    configuring the cellular modal antenna in a first mode by adjusting the first and second active elements;
    receiving first pilot signals from the base station transceivers in proximity with the cellular modal antenna being configured in the first mode;
    for each first pilot signal received, measuring a received power level and storing data associated with said received power level and said first mode in memory coupled to the antenna;
    configuring the cellular modal antenna in a second mode by adjusting the first and second active elements;
    receiving second pilot signals from the base station transceivers in proximity with the cellular modal antenna being configured in the second mode;
    for each second pilot signal received, measuring a received power level and storing data associated with said received power level and said second mode in memory coupled to the antenna;
    comparing each of the received power levels for each pilot signal in each of said modes;
    determining an angle of arrival for each of the pilot signals received in each of said modes; and
    using the determined angle of arrival associated with the received pilot signals to determine a location fix.

2. The method of claim 1, further comprising:
    adjusting said second active element coupled to the steering conductor to steer a null of the antenna radiation pattern; and
    monitoring one or more of the pilot signals as the null is steered.

3. The method of claim 2, further comprising:
    with the determined location fix,
    using information of the location fix, antenna modes, and stored data to configure a mode of a second antenna within the device, wherein the second antenna comprises a modal GPS antenna, and said configured mode of the second antenna includes an optimum mode for obtaining a GPS location of the device.

4. A wireless device comprising:
    a cellular modal antenna configured for acquisition of a device location, the cellular modal antenna comprising:
        an antenna radiating element positioned above a circuit board and forming an antenna volume therebetween;
        a tuning conductor element positioned within the antenna volume and coupled to a first active element for varying a reactance of the tuning conductor element;
        a steering conductor element positioned outside of the antenna volume and adjacent to the antenna radiating element, the steering conductor element coupled to a second active element for varying a current mode of the steering conductor element;
    wherein the cellular modal antenna is configured to produce a plurality of distinct radiation patterns each corresponding to the antenna when configured in one of a plurality of possible antenna modes, each of said plurality of antenna modes being set with a distinct configuration of the first and second active elements; and
    a GPS modal antenna,
    the GPS modal antenna being configured to produce a plurality of second radiation patterns each associated with one of a plurality of possible modes of the GPS modal antenna, wherein the GPS modal antenna is further configured to produce a distinct radiation pattern having a resonance in one or more GPS frequency bands for each of the plurality of possible modes thereof.

5. The wireless device of claim 4:
    further comprising a processor and memory for storing information related to the plurality of cellular and GPS antenna modes and configuring the respective antennas in the respective modes,
    wherein said wireless device is configured to:
        determine a location fix using the cellular modal antenna; and
        using said location fix, configure the GPS modal antenna in an optimum mode for establishing a connection with GPS satellites.

* * * * *